United States Patent Office

3,352,650
Patented Nov. 14, 1967

3,352,650
METALLIC COMPOSITES
David Goldstein, Adelphi, William J. Buehler, Bethesda, and Raymond C. Wiley, Rockville, Md., assignors to the United States of America as represented by the Secretary of the Navy
No Drawing. Filed July 19, 1965, Ser. No. 473,249
12 Claims. (Cl. 29—191)

The invention described herein may be manufactured and used by or for the Government of the United States of America for governmental purposes without the payment of any royalties thereon or therefor.

This invention pertains to novel composites and more particularly to novel metallic composites.

Composites of glass fiber reinforced plastics are widely used for many applications, ranging from boat hulls to rocket motor cases. These composites are formed by embedding a fibrous material, usually in filament form, in a plastic matrix with the strength of the composite being dependent upon the compatibility of the two components, i.e., the ability of the components to form a strong bond with a narrow diffusion zone. If such compatibility exists, the components act together as a unit (they strain in equal amounts) and the matrix, which has the lower modulus of elasticity and tensile strength, transfers stresses to the stronger fibrous component. This property enables the composite to have a greater strength than either component could have individually.

For many applications metallic composites would be more suitable but attempts to make such composites have not been very successful due to the general incompatibility of the metallic components employed.

Accordingly, it is an object of this invention to provide a novel metallic composite.

It is another object of this invention to provide a metallic composite in which there is a genuine compatibility between the components.

It is a further object of this invention to provide a composite that can be formed by inexpensive procedures.

These and many other objects will become more apparent upon reading the following detailed description of the invention.

The objects of this invention are accomplished by a composite comprising a refractory metal or refractory metal alloy (hereinafter the term "refractory metal" refers to both refractory metals and refractory metal alloys) embedded in a nickel-titanium alloy matrix comprising about 53–62 weight percent nickel with the remainder being essentially titanium (hereinafter referred to as TiNi). As examples of the refractory metal components that are operable in this invention there may be mentioned; tungsten, rhenium, molybdenum, tungsten based alloys such as 3% rhenium remainder tungsten, 30–32% rhenium remainder tungsten, 30% molybdenum remainder tungsten, 50% molybdenum remainder tungsten, etc.; the molybdenum based alloys such as 2% tungsten remainder molybdenum, 30% tungsten remainder molybdenum, etc.; and the rhenium based alloys such as 47–50% molybdenum remainder rhenium, etc.

Since there is a wide difference in the melting points of the components (e.g., tungsten melts at 3410° C. and TiNi melts at 1310° C.) and only a minimal amount of the refractory metal component dissolves in the TiNi, the composite may be readily formed by immersing the refractory metal component in molten TiNi which is then allowed to solidify in place. In cases where the refractory metal component has a very high density or where it is used in discrete particles, some stirring is necessary in order to prevent sinking and coalescing respectively. It should be readily apparent to those skilled in the art that any technique by which the alloy matrix can be melted, provides an easy means for forming the composite.

The TiNi readily wets the surface of the refractory metal component thus forming an excellent bond between the two components. The refractory metal component may be of any size or shape among which there can be mentioned; filaments, whiskers, wires, discrete particles, solid sheets, porous compacts etc., but it should be readily apparent that the tensile strength of the refractory metal component and thus the tensile strength of the composite will be dependent on the refractory metal's size and shape, with micron size diameter filaments (high ratio of surface area to volume) having greater tensile strengths than larger diameter wires. The refractory material may be oriented and spaced in any manner but the ultimate strength of the composite is also dependent upon these factors. For example, an axial orientation will improve axial tensile strength while a random orientation will improve the tensile strength in all directions. The known engineering and technological principles concerning size, shape, orientation and dispersion of fibrous components in glass fiber reinforced plastics are equally applicable to the refractory metal composites of this invention and thus by an application of these principles, those skilled in the art can readily manufacture composites having a wide variety of structural properties.

The following examples illustrate a specific embodiment of the invention but its scope is not to be limited thereto.

EXAMPLE I 114 grams of TiNi (55.1 weight percent nickel with the remainder being essentially titanium) in button form, was melted in a 3⅞" long ingot. Four .040" diameter tungsten wires, each weighing 1.2 grams, were embedded in the melted TiNi which was then allowed to solidify in place. A radiograph of the ingot showed no break in the wires and only a small diffusion zone which indicates compatibility during solidification and no melting of one into the other respectively.

The sample was then subjected to tensile stresses by swaging at 900° C. A radiograph showed no breaks in the wires thus indicating the presence of a strong metallurgical bond which allowed the components to elongate and stretch together.

EXAMPLE II

A composite was formed by embedding three .040" diameter molybdenum wires in both a 55.1% nickel and a 60% nickel TiNi matrix. Again after swaging at 900° C., a radiograph showed no breaks in the wires.

EXAMPLE III

In order to show that there is a critical relationship between the refractory metal component and the TiNi matrix, composites were former by embedding three .040" diameter tungsten wires in an iron, titanium, and nickel matrix. These composites were radiographed after being subjected to tensile stresses by swaging at 900° C. and these radiographs showed breaks in the wires. This indicates that a strong metallurgical bond is not formed between the components and thus they are not suitable for composites.

EXAMPLE IV

In order to further show the critical relationship between the components of the invention, the formation of composites of refractory metals and commercially available nickel and titanium based alloys was attempted with the following results:

TABLE

| Alloy | Refractory Component | Remarks |
|---|---|---|
| Inconel-W Nickel based alloy produced by International Nickel, 64-75% Ni, 2.7% Ti, 14.5% Cr, 6-17% Fe, .6% Al. | Four .040″ diameter tungsten wires. | Wire broke during solidification. |
| Hastelloy-X Nickel based alloy produced by Haynes Stellite, a Division of Union Carbide and Carbon, 43-54% nickel with the remainder being Iron, Chromium, Molybdenum, Cobalt and Tungsten. | ----do---- | Do. |
| 6% Aluminum, 4% Vanadium, remainder essentially titanium. | Three .040″ diameter molybdenum wires. | Do. |
| 3% Aluminum, 13% Vanadium, 11% Chromium, remainder essentially titanium. | ----do---- | Do. |

The above tests show the general incompatibility between refractory metals and standard nickel and titanium based alloys.

EXAMPLE V

TiNi (55.4% nickel remainder essentially titanium) was melted in a 7/8″ x 1 5/8″ x 1/2″ ingot and a sheet of tungsten (1 3/8″ x 1/2″ x .020″) was placed in the melted TiNi which was allowed to solidify. The resulting composite was hot rolled at 900° C. along its longitudinal axis. A radiograph of the composite showed that the length of the tungsten increased 59% and the TiNi increased 57.5%. This approximately equal elongation indicates that a strong bond exists between the components. The composite was then cross rolled at 900° C. and the width of the tungsten increased 100% and the TiNi increased 107%. This indicates both a strong bond and the ability of the composite to be rolled in any direction.

This invention provides a unique and highly compatible group of useful engineering composite materials. They are readily formed, have many useful engineering applications and can be fabricated into finished structures e.g. rocket motor casings by presently existing procedures.

Obviously many modifications and variations of the present invention are possible in the light of the above teachings. It is therefore to be understood that within the scope of the appended claims the invention may be practiced otherwise than as specifically described.

What is claimed is:

1. A composite comprising a refractory metal component embedded in a nickel-titanium alloy matrix, said refractory metal being selected from the group consisting of tungsten, rhenium, molybdenum, alloys of tungsten and molybdenum, alloys of tungsten and rhenium, and alloys of molybdenum and rhenium, and said nickel-titanium alloy comprising 53-62 weight percent nickel with the remainder essentially titanium.

2. The composite of claim 1 wherein the refractory metal component is tungsten.

3. The composite of claim 1 wherein the refractory metal component is molybdenum.

4. The composite of claim 1 wherein the refractory metal component is rhenium.

5. The composite of claim 1 wherein the refractory metal component is in filament form.

6. The composite of claim 1 wherein the refractory metal component is in the form of a solid sheet.

7. The composite of claim 1 wherein the refractory metal component is in the form of a porous compact.

8. The composite of claim 1 wherein the refractory metal is in the form of a wire.

9. A method for forming metallic composite comprising melting a nickel-titanium alloy comprising 53-62 weight percent nickel with the remainder essentially titanium, placing a refractory metal component selected from the group consisting of tungsten, rhenium, molybdenum, alloys of tungsten and molybdenum, alloys of tungsten and rhenium, and alloys of rhenium and molybdenum in said melted alloy, and allowing said alloy to solidify in place.

10. The method of claim 9 wherein the refractory metal is tungsten.

11. The method of claim 9 wherein the refractory metal is molybdenum.

12. The method of claim 9 wherein the refractory metal is rhenium.

References Cited

UNITED STATES PATENTS

| 3,084,421 | 4/1963 | McDonels et al. | 29—183.5 |
| 3,098,723 | 7/1963 | Micks | 29—183.5 |
| 3,138,837 | 6/1964 | Weeton et al. | 29—180 |
| 3,174,851 | 3/1965 | Buehler et al. | 75—170 |
| 3,282,658 | 11/1966 | Wainer | 29—183.5 |

DAVID L. RECK, *Primary Examiner.*

RICHARD O. DEAN, *Examiner.*